(12) United States Patent  
Schumacher et al.

(10) Patent No.: US 7,841,560 B2  
(45) Date of Patent: Nov. 30, 2010

(54) SEAT DEVICE FOR AN AIRCRAFT

(75) Inventors: Markus Schumacher, Buxtehude (DE); Andrew Muin, Harsefeld (DE)

(73) Assignee: Airbus Deutschland GmbH, Hamburg (DE)

( * ) Notice: Subject to any disclaimer, the term of this patent is extended or adjusted under 35 U.S.C. 154(b) by 514 days.

(21) Appl. No.: 11/873,474

(22) Filed: Oct. 17, 2007

(65) Prior Publication Data

US 2008/0099608 A1 May 1, 2008

Related U.S. Application Data

(60) Provisional application No. 60/829,721, filed on Oct. 17, 2006.

(30) Foreign Application Priority Data

Oct. 17, 2006 (DE) .................... 10 2006 049 001

(51) Int. Cl.
*B64D 11/00* (2006.01)
(52) U.S. Cl. .............. 244/118.5; 244/118.6; 244/122 R
(58) Field of Classification Search .............. 244/118.5, 244/118.6, 122 R
See application file for complete search history.

(56) References Cited

U.S. PATENT DOCUMENTS

| | | | | |
|---|---|---|---|---|
| 6,390,547 B1 * | 5/2002 | Spykerman | .............. | 297/188.1 |
| 7,156,457 B2 * | 1/2007 | Fujita et al. | .............. | 297/216.1 |
| 7,240,943 B2 * | 7/2007 | Williamson et al. | ...... | 296/37.15 |
| 7,517,010 B2 * | 4/2009 | Saint-Jalmes et al. | ........ | 297/118 |
| 2003/0222174 A1 * | 12/2003 | Saint-Jalmes | ............ | 244/118.1 |
| 2006/0163917 A1 * | 7/2006 | Schroeder et al. | ......... | 297/188.1 |
| 2007/0241233 A1 * | 10/2007 | Cona | ....................... | 244/118.6 |

FOREIGN PATENT DOCUMENTS

| | | |
|---|---|---|
| DE | 1198680 | 8/1965 |
| DE | 19534024 A1 | 3/1997 |
| DE | 10214104 C1 | 12/2003 |
| DE | 102004017078 A1 | 11/2005 |
| DE | 102004050082 A1 | 4/2006 |
| EP | 0197167 A1 | 10/1986 |

* cited by examiner

*Primary Examiner*—J. Woodrow Eldred
(74) *Attorney, Agent, or Firm*—Christopher Paradies; Fowler White Boggs P.A.

(57) ABSTRACT

The present invention relates to a seat device for an aircraft. The seat device comprises a seat installation and a shell structure. In this arrangement the inside of the shell structure comprises an enclosed stowage space, wherein the shell structure is designed to attach the seat installation to a floor structure. In this arrangement the enclosed stowage space is designed to accommodate an item of baggage.

22 Claims, 16 Drawing Sheets

SEAT DEVICE FOR AN AIRCRAFT

REFERENCE TO RELATED APPLICATIONS

This application claims the benefit of the filing date of German Patent Application No. 10 2006 049 001.0 filed Oct. 17, 2006 and of U.S. Provisional Application No. 60/829,721 filed Oct. 17, 2006, the disclosure of which applications is hereby incorporated herein by reference.

FIELD OF THE INVENTION

The field relates to a seat device for an aircraft, to a use of a seat device in an aircraft, as well as to an aircraft comprising a seat device.

BACKGROUND

In modern commercial aircraft, hand baggage is usually stowed away underneath the passenger seats if it is too heavy to be loaded into the overhead stowage bins or hatracks. In this arrangement the items of baggage can be stowed underneath a passenger's own seat or underneath the closest seat in front. The closest seat in front is accessible from the rear, and at its front end is delimited by a baggage retention bar. If this space does not contain any baggage, then it provides additional foot space for the passenger.

The entire under-seat volume that can be used for baggage is defined by the width of the seat, the depth of the seat multiplied by the available height under the seat. In today's commercial aircraft, passenger seats comprise a skeleton-type support structure so that each passenger seat has two seat legs or skeleton-type support devices.

The overall volume is thus partly defined by the seat bases, which form sub-volumes in each seat row. However, most of the time these sub-volumes under the passenger seat are not identical in size. In addition, several built-in items, for example life vests, in-flight entertainment devices or seat-electronic boxes have to be installed underneath the seat. This additionally reduces the space underneath the individual seats and leaves it very unevenly distributed.

DE 195 34 024 A1 discloses a seat group for an aircraft. The seat group comprises a load-bearing structure that supports several seats, each comprising a seat part and a backrest. By way of at least one common guide rail the seats are transversely slidable, wherein devices for transverse sliding can be provided at least on the aisle-side seats.

DE 102 14 104 describes a vehicle seat, in particular a passenger seat. The vehicle seat comprises a seat part and a backrest which are arranged on a seat frame. In this arrangement the seat part can be folded on a horizontal axis from a first, almost vertical, position to a second, almost horizontal, position.

When the vehicle seats are swung up, during loading and unloading the overhead stowage bins, passengers can step between the seats so that the aisle of the aircraft remains free for passengers to move in it. The aisle is thus not blocked during loading of the overhead stowage bins so that boarding and deplaning of the aircraft's passengers takes place more quickly. However, the skeleton-type design of the transverse structure of the seat row, i.e. the skeleton-type design with the seat legs, narrows the possible stowage space under the seats.

SUMMARY

There is a longstanding and unresolved need to increase secure storage space in commercial and private aircraft; however, the space under seats is used inefficiently to store small bags at the expense of foot room. A seat device for an aircraft unexpectedly solves this longstanding and unresolved need. The seat device may be used in an aircraft having a floor structure, by attaching the seat device to the floor structure. The seat device comprises a seat installation and a shell structure attachable to the floor of the aircraft. The shell structure comprises an enclosed stowage space for accommodating an item of baggage.

The shell structure may be designed to attach the seat installation to the floor structure, such that access to the enclosed stowage space is provided for accommodating one or more items of baggage. The aircraft comprising the seat device may have more secure storage space for carry on luggage, and articles normally haphazardly stored underneath the seat in front of a passenger may be secured in the enclosed stowage space. The method of installing and using the seat device may provide greater security.

According to an embodiment, the present invention describes a seat device whose supporting structure does not comprise a skeleton-type support structure but instead a shell structure which at the same time can accommodate baggage in an enclosed stowage space. Because of the shell structure there may no longer be a need to provide a skeleton-type structure that requires seat legs and other components that reduce the size of the stowage space, and a larger stowage space may be provided without sacrificing passenger comfort during flight operations. Furthermore, the shell structure can be made from thin materials that comprise fibre-reinforced materials so that in addition savings in weight can be achieved.

The term "shell structure" may refer to any box-shaped structures or structures that form a space. A shell structure may comprise, for example, a floor element on which four wall elements are arranged so that the shell structure can form an interior space or a stowage space. The term "seat device" is used broadly to refer to a seat and/or its component parts and may refer to any elements of a seat, for example a backrest, an armrest, a headrest, a seat area, etc.

According to a further embodiment, the seat device further comprises a base plate, wherein the shell structure can be attached to the base plate, wherein the base plate can be attached to the floor structure. If a base plate is attached between the shell structure and the floor structure then the shell structure can be attached more flexibly and simply to various attachment locations. The flexibility of the seat device is thus increased and a change in the position, for example along the longitudinal axis of the aircraft, is facilitated.

According to a further embodiment, the shell structure can be slidably attached to the base plate. For example, by means of rail systems or other flexible attachment systems the shell structure can be slidable on the base plate so that in this way the flexibility of the seat device can be enhanced.

According to a further embodiment, the shell structure forms an attachment surface with the base plate. In this arrangement the area of the base plate is larger than the attachment surface.

While the base plate can also be finished off so as to be flush with the attachment surface of the shell element, with a larger base plate it is however possible to provide a more stable attachment so that greater acceleration forces can act on the seat device. If the base plate is enlarged along a direction of the action of the acceleration force, this leads to more favourable lever ratios. Lower load moments are due to the more favourable lever ratios so that the loads which the attachment means exert on the floor structure are reduced. Despite the provision of more favourable lever ratios due to an increase in the size of the base plate, nevertheless no useful space is wasted because on the base plate apart from the seat elements, for example a useful area is also provided, such as an area in which passengers can place their feet.

According to a further embodiment, the seat installation comprises a movable seat element. The shell structure comprises an opening to the enclosed stowage space. The movable seat element is designed so that in a first position it closes the opening. Furthermore, the seat element is designed so that in a second position it renders the opening free such that the enclosed stowage space is accessible. The movable seat element can, for example, comprise a seat cushion on which passengers are seated. By means of the embodiment the seat element can cover the opening in one position and a passenger can, for example, sit on it, while in a second position said seat element can be opened so that the passenger can place baggage into the enclosed stowage space.

According to a further embodiment, the shell structure further comprises a protective element, wherein the protective element is designed to accommodate the seat element in the second position. The protective element can, for example, comprise a protective bag, a protective film, a rigid protective shell or some other element that can accommodate the seat element. Since the seat element in the open state could, for example, be near shoes of a passenger seated behind, the seat element or the seat cushion can retract into the protective sleeve or the protective element, which, for example, comprises a garage-like or pocket-like protective container. In this way the seat element remains hygienically clean during the loading process. In this arrangement the seat element can automatically retract into the protective element without the need for a passenger to insert the protective element into the protective sleeve or into the protective element.

According to a further embodiment, the seat element is designed to be movable such that when it is moved from the first position to the second position said seat element moves along an arcuate path. By means of an arcuate movement of the seat element for opening the enclosed stowage space, less space is required than is the case using conventional folding mechanisms for opening the seat elements. By means of the arcuate movement of the seat element during opening, this movement along an arcuate path prevents the covering of a larger space which could otherwise be blocked by passengers or by other items of baggage. By means of this opening-movement along an arcuate path, the seat element can thus be moved in a targeted and space-saving manner.

According to a further embodiment, the seat element comprises a lower seat area, wherein the lower seat area is designed such that a contour of the lower seat area is in the shape of an arcuate path. Because the underside of the seat element or the lower seat area is in the shape of an arcuate path, components that are situated within the arcuate path cannot impede the movement of the seat element. Therefore the contour of the underside reduces the danger of any wedging occurring during the movement from the first to the second position.

According to a further embodiment, the shell structure comprises a rear wall. The rear wall has a wall contour portion in the shape of the arcuate path. During opening of the seat element, the seat element clears the rear wall without any wedging occurring, because the rear wall has a contoured portion that clears the arcuate path, such as a circle or other arc, taken by the seat element as it is moved. If the contour portion of the rear wall and the counter of the lower seat element are identical, then the movement of the seat element over the contour portion of the rear wall keeps the seat element congruent to the rear wall in the open position, requiring less space for the opening mechanism of the seat element and increasing the usable enclosed space for storage.

According to a further embodiment, the seat element can comprise a rotation cheek with a rotation axis. The rotation cheek can be attached to the shell structure by means of the rotation axis. In this arrangement the rotation cheek is designed such that the seat element is movable on the rotation axis in a way that corresponds to the arcuate path. By means of the rotation cheek the seat element is connected to the rotation axis. In this arrangement the rotation cheek can be arranged inside or outside the shell structure. Therefore, when the seat element is moved from the first position to the second position, movement can be along the predetermined arcuate path. In this arrangement the radius between the rotation axis and the seat element remains constant so that this results in the predetermined arcuate path. By means of the rotation cheek a simple opening mechanism of the seat element is created, with which in a simple manner the seat element can be moved, for example behind the seat along a predetermined arcuate path.

According to a further embodiment, the shell structure comprises a guide rail. In this arrangement a contour of the guide rail corresponds to the shape of the arcuate path. The seat element engages the guide rail such that said seat element is movable in a way that corresponds to the arcuate path. In this way an opening mechanism of the seat element can be provided without the stowage space underneath the seat being reduced in size.

According to a further embodiment, the guide rail can be designed so as to comprise several parts, wherein said guide rail is telescopically retractable. Because the guide rail is designed so as to comprise several parts, in an open state of the seat element the guide rail can also be reduced in size so that said guide rail does not block the opening of the stowage space. In this way the procedure of loading items of baggage into the stowage space can be facilitated. In this arrangement the guide rails can be telescopically retractable in that the multipart guide rails comprise different cross sections and can thus be slid into each other.

According to a further embodiment, the shell structure comprises a perforated structure. The perforated structure can be selected from the group comprising stamped perforated metal sheets, framework structures, mesh, and open-worked composite material shells. Hereinafter the term "perforated structure" refers to a shell structure that comprises perforations i.e. openings in the direction of the interior space. In this way the stowage space can be seen through the perforated structure so that dangerous items of baggage can be detected early. In this way safety in the aircraft cabin can be improved.

According to a further embodiment, the shell structure further comprises a deformation region. In this arrangement the deformation region is designed to cushion an action of force on the shell structure. If a force acts on the shell structure, for example an acceleration force as a result of an accident, the deformation region of the shell structure can change its shape and in this way can cushion the action of the force as is the case in a crumple zone. A progressive characteristic curve is desired in the deformation behaviour of crumple zones, in which characteristic curve at the beginning of the deformation path the behaviour of the structure is softer, and subsequently gradually hardens in order to cushion various actions of force. The deformation region of the shell structure can, for example, comprise various concertina-type structures or can be controlled by corresponding insert parts. Expansion bellows structures or concertina-type structures do not have a constant surface area in the direction of force, but instead their surface areas are alternately slightly angled in the direction of the line of action of force. In this way the rigidity of a material in the direction of the action of force can be reduced in a targeted manner so that deformation occurs in response to corresponding load action. Furthermore, as a result of this, the action of a force is cushioned by the deformation of the deformation region of the shell structure. A perforated design of the shell structure may be used to control the deformation behaviour of a deformation region.

According to a further embodiment, the shell device comprises a torsion bar. In this arrangement the torsion bar is designed to reduce twisting of the shell structure. In this arrangement the torsion bar is designed to reinforce the shell structure such that twisting does not occur. In order to prevent twisting, a plurality of torsion bars may be provided which are, for example, coupled to a parallelogram structure or a trapezoidal structure. If a shell structure is, for example, loaded only on one side, this can result in one-sided deformation of said shell structure. By means of the torsion bar the force is transferred from the loaded side also to the non-loaded side so that the shell structure deforms at the same time, and twisting of the shell structure is reduced. By means of the torsion bar one-sided deformation of the shell structure can be prevented, and even the precise deformation path can be controlled. Apart from the shell structure this also relates to the seat elements, for example armrests, backrests or the seat areas, which also constantly move together with the shell structure.

According to a further embodiment, the shell structure comprises a framework structure with a plurality of levers, wherein the plurality of levers form a parallelogram or a trapezoidal shape. The at least one torsion bar is designed to be connected with one lever of the plurality of levers. In this way the shell structure can be reinforced so that twisting is reduced.

According to a further embodiment, the seat device comprises a plurality of seat installations, wherein the shell structure is designed to attach the plurality of seat installations to the floor structure. The shell structure can thus comprise several seat installations and provide shared stowage space for each seat installation. In this way it is possible, for example for 2, 3, 4 or 5 seat installations arranged side-by-side on the shell structure to create a continuous stowage space that is not divided by any skeleton-type structures or seat legs. In this way it is also possible to stow away longer awkward-shaped items of baggage.

According to a further embodiment, the shell structure comprises a side wall. In this arrangement the side wall has a curvature that corresponds to the curvature of the aircraft structure. The term "aircraft structure" can, for example, refer to the stringers, frame elements or other load-bearing bracing in an aircraft. Furthermore, the term "curvature of the aircraft structure" may also refer to a curvature in an aircraft skin. The shell structure can thus fit snugly against the exterior skin of the aircraft without there being any waste of space so that the available space is used very well.

According to a further embodiment, the seat device further comprises a further seat installation, wherein the shell structure is designed to attach the further seat installation to a floor structure. The further seat installation comprises a clearance space between the floor structure and the further seat installation. With this embodiment, for example an aisle-side seat in an aircraft cabin can be designed without a baggage box. In that location, a passenger could, for example, step between the seat rows and keep the aisle free for passing passengers. In this way it is possible to reduce boarding- and deplaning times of a passenger aircraft.

According to a further embodiment, the seat device comprises a plurality of shell structures. The plurality of shell structures are attachable to the base plate. By means of a plurality of shell structures on a base plate a type of modular system can be created in which a base plate is fitted with the particular number of identical shell structures with seat installations that are required in each case. Exceptions to this only relate, for example, to window seats, which, due to the curvature of the aircraft structure, would have to be provided with left-hand side or right-hand side contour indentations. An aircraft cabin can thus flexibly and variably be provided with the required number of seat devices. When fitting the individual shell boxes to a base plate, the modular system would only have to comprise three types: namely a right-hand side window seat, a left-hand side window seat and a seat in the middle, in other words a seat with a straight contour would have to be provided. In this way standard shell structures can be created, and consequently production costs can be reduced. Furthermore, for example by allocating a shell structure to a seat installation, an individual stowage space for passenger baggage can be provided.

The embodiments of the seat device apply to their use as well as to the aircraft and vice versa.

BRIEF DESCRIPTION OF THE FIGURES

Below, for further clarification and to provide a better understanding of the present invention embodiments are described in more detail with reference to the enclosed drawings. The following are shown.

DETAILED DESCRIPTION

Figure 1:
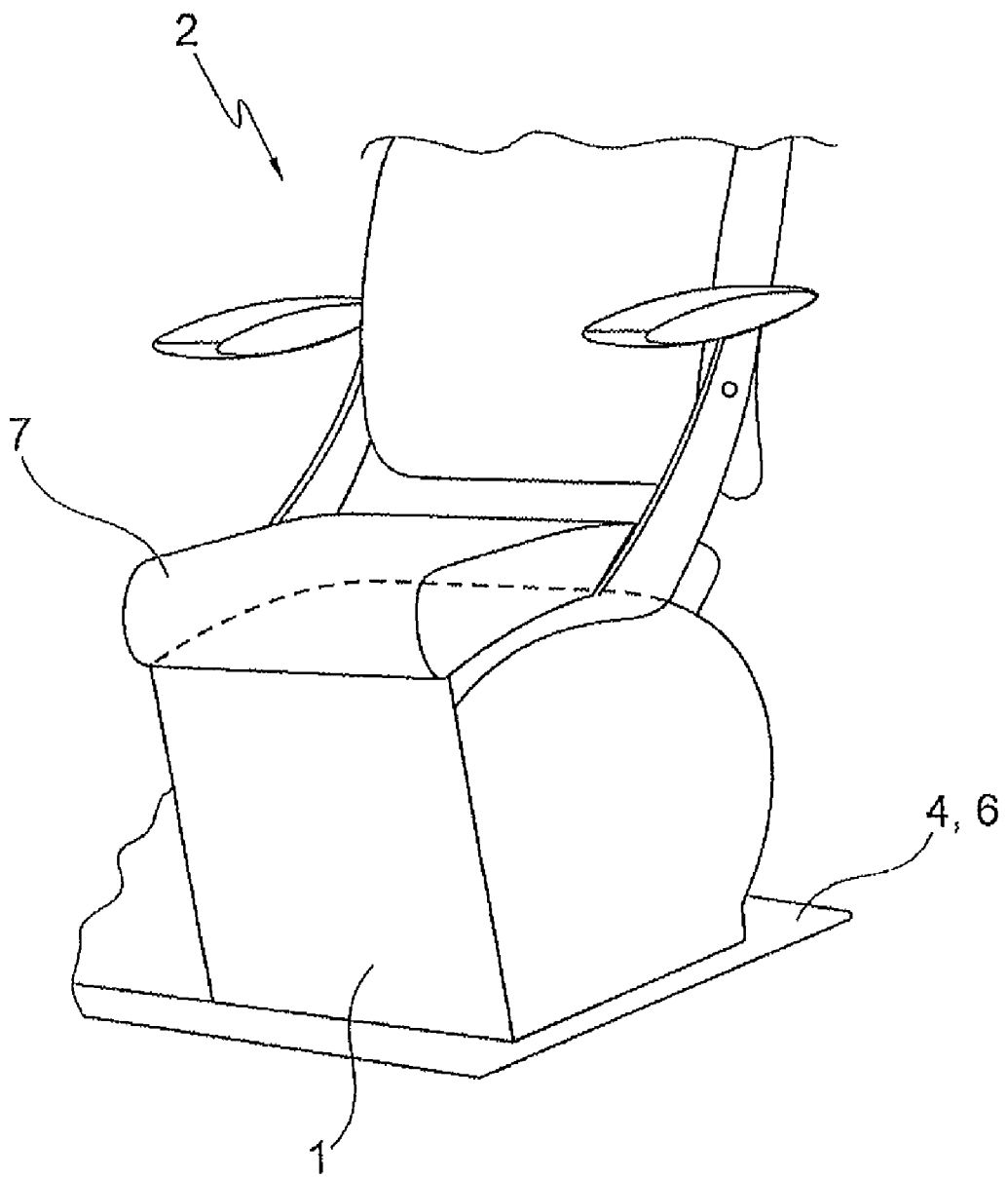
FIG. 1 a diagrammatic view of an embodiment of a seat device.

The examples described and drawings rendered are illustrative and are not to be read as limiting the scope of the invention as it is defined by the appended claims.

Identical or similar components in different figures have the same reference characters. The illustrations in the figures are diagrammatic and not to scale.

FIG. 1 shows an embodiment. The seat device comprises a seat installation 2 and a shell structure 1. In this arrangement the interior of the shell structure 1 comprises an enclosed stowage space 3, wherein the shell structure 1 is designed to attach the seat installation 2 to a floor structure 4. In this arrangement the enclosed stowage space 1 is designed to accommodate an item of baggage. In this arrangement the seat installation 2 is not attached by means of a skeleton-type structure, for example by way of seat legs, to a floor structure 4 or to a base plate 5, but instead is attached by way of a shell structure 1. In this way a larger interior space or stowage space 3 can be created. Furthermore, FIG. 1 shows a seat element 7, on which a passenger can, for example, be seated.

FIGS. 2-5 show the attachment of a seat device comprising a seat installation 2 and a shell structure 1 to a base plate 5.

Figure 2:
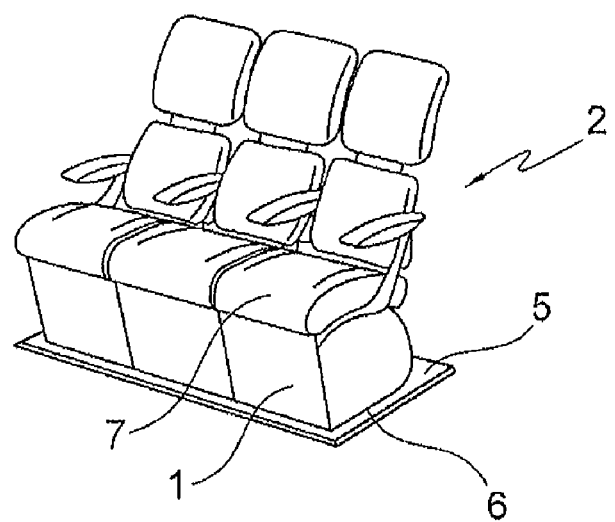
FIGS. 2-5 diagrammatic views of seat devices which in various positions are attached to a base plate, according to an embodiment.

FIG. 2 shows a base plate 5, which forms an attachment surface 6 with the shell structure 1. In this arrangement the base plate 5 is dimensioned according to the size of the attachment surface 6. A seat device with a base plate 5 can thus be used in a space-saving manner.

Figure 3:
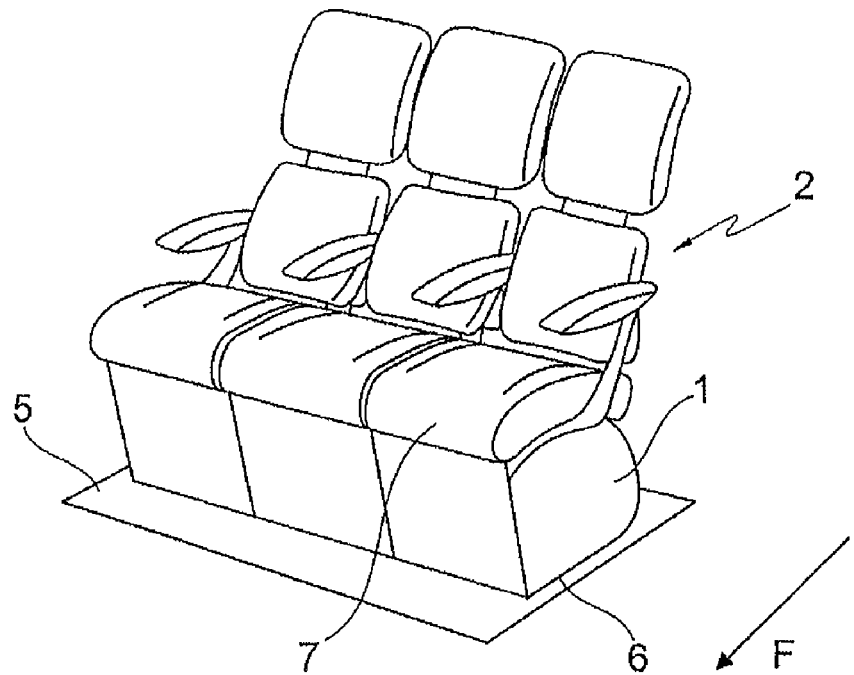
Figure 4:
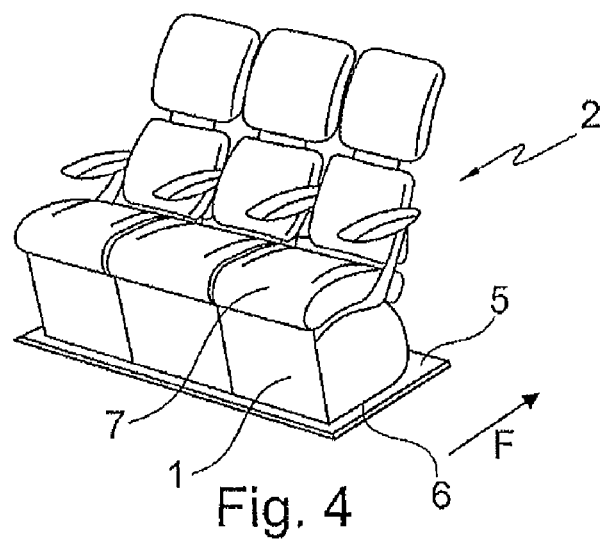
Figure 5:
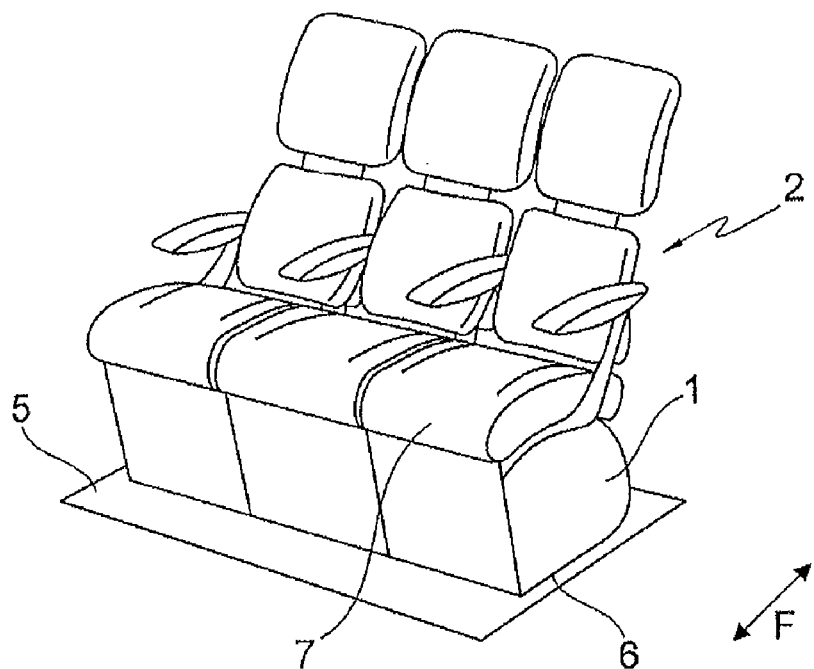

FIG. 3 shows a seat device or a shell structure 1 that is arranged on a base plate 5. In this arrangement the base plate 5 is larger than the attachment surface 6 that is formed by means of the shell structure 1 and the base plate 5. Along a line of action of force F it is thus possible in a targeted manner to constructively provide favourable lever ratios so that the seat device can withstand greater acceleration forces. As shown in FIGS. 3 and 4 it is advantageous if the base plate 5 along the line of action of force F forms a larger area with the floor structure 4. Furthermore, the base plate 5 can be dimensioned for all load cases, as is, for example, shown in FIG. 5.

Figure 6:
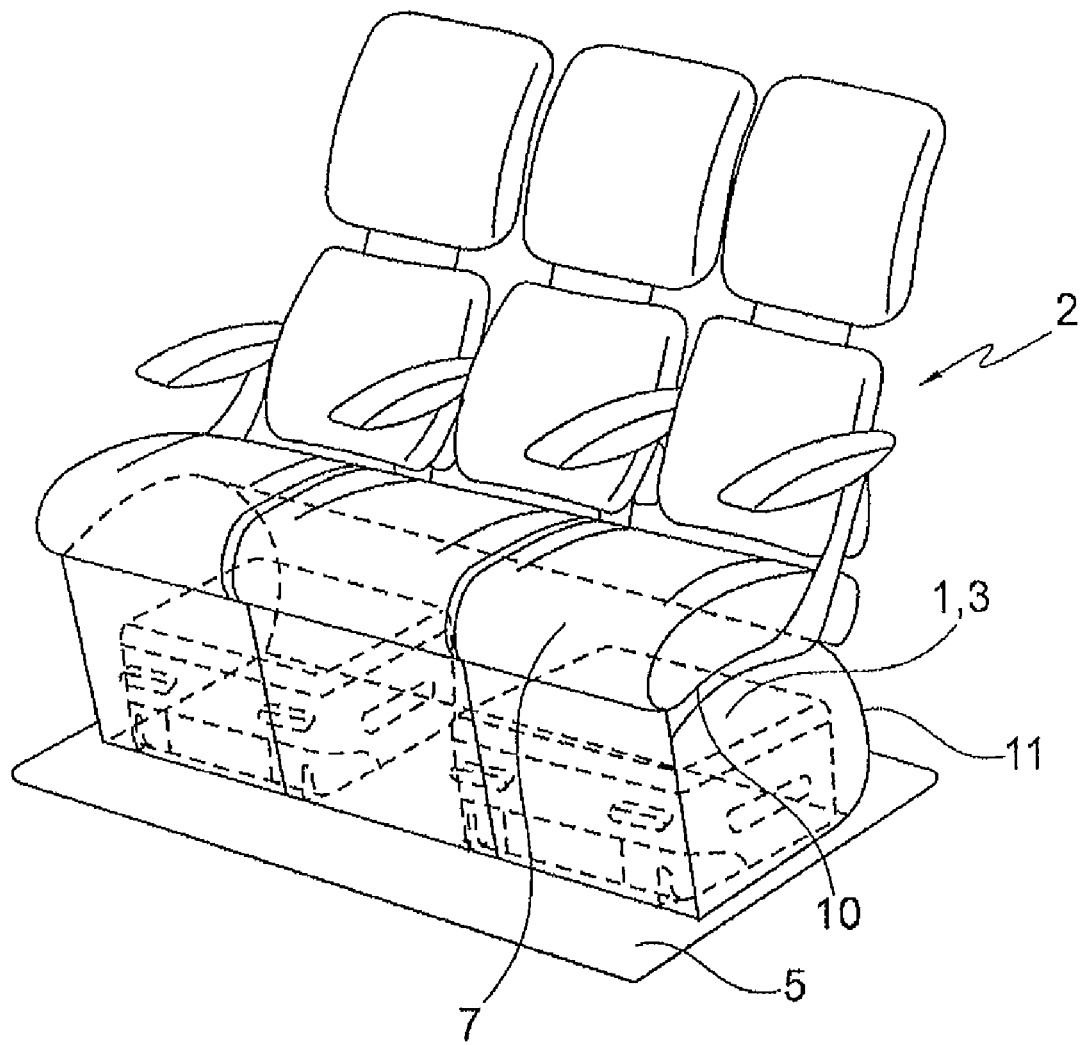
FIG. 6 a diagrammatic view of a seat device comprising a continuous stowage space, according to an embodiment.

FIG. 6 shows a seat device comprising a seat installation 2 and a shell structure 1. In this arrangement the shell structure comprises a stowage space 3 in which items of baggage may be stowed. The seat installation 2 comprises a seat element 7 that has a lower seat area 10. In this arrangement the lower seat area 10 has an arcuate contour. Furthermore, at the rear the shell structure 1 forms a rear wall 11 with an arcuate contour. In this arrangement the arcuate contour of the rear wall 11 and of the lower seat area 10 may correspond so that the lower seat area may be designed so as to move along the rear wall 11 without becoming wedged. Because their contours are the same, the seat element 7 and the rear wall 11 may be arranged so as to be positive-locking in an open position, so that space may be saved.

The seat element 7 may be moved tangentially in relation to an arcuate path. In this way space may be saved in comparison to a conventional folding seat arrangement with a folding movement of the seat element in which the seat element is held along an axis such that each point of the seat element travels different paths (with different radii) during the folding movement. During movement of the seat element 7 from a closed first position to an open second position, along an arcuate path, both the front part of the seat element 7 and the rear part of the seat element 7 being closer to the backrest, may travel along the same path because the seat element 7 as a whole moves tangentially in relation to the arcuate path.

Figure 7:
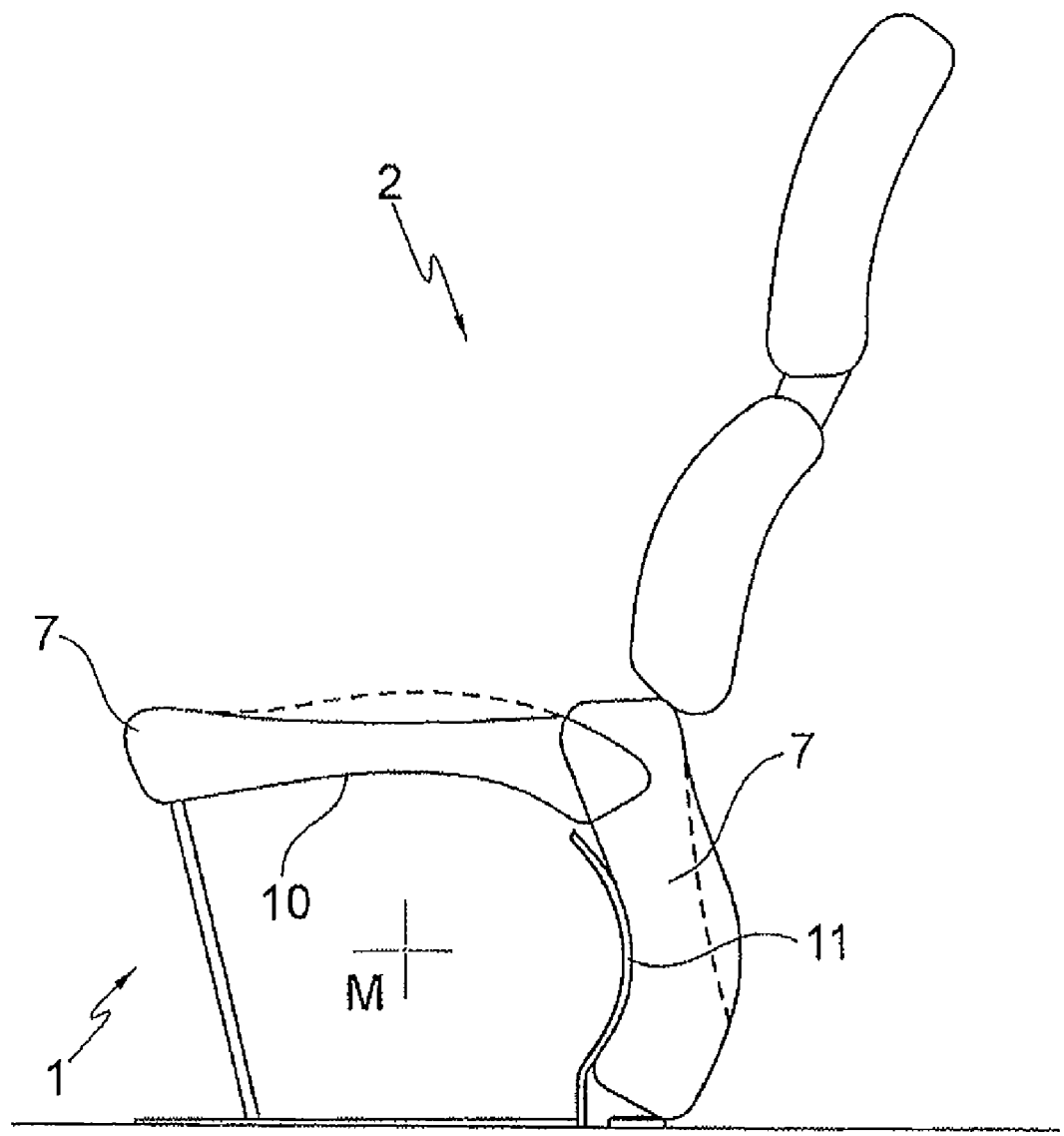
FIG. 7 a diagrammatic view of a seat device comprising an opening mechanism of the stowage space, according to an embodiment.

FIG. 7 shows a more detailed lateral view of a seat device comprising a seat element 7 and a shell structure 1. In this arrangement the shell structure comprises a rear wall 11 that forms an arcuate contour. The seat element 7 comprises a lower seat area 10 with an arcuate contour. In this arrangement the arcuate contours of the lower seat area 10 and of the rear wall 11 have the same arcuate shape or the same radius to the center M of the contour circle or of the arcuate path. This seat element 7 with lower seat area 10 may thus move along over the contour of the shell structure, in particular along the rear wall 11, without much space being wasted and without said lower seat area 10 becoming wedged.

Figure 8:
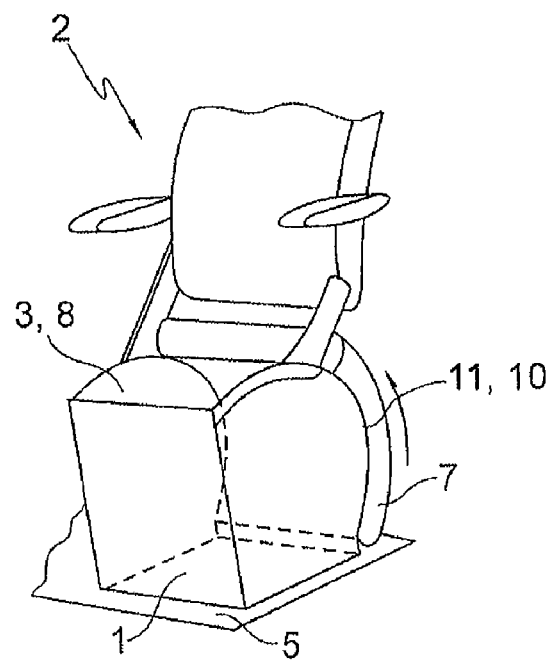
FIGS. 8, 9 a diagrammatic view of a seat device comprising a mechanical opening device in which the seat element opens along an arcuate path, according to an embodiment.
Figure 9:
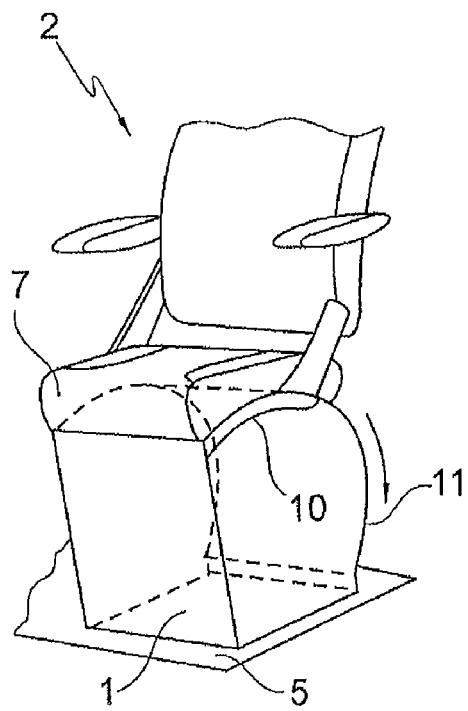

FIGS. 8 and 9 show a seat device with a shell structure 1 and a seat installation 2 in which the seat element 7 is in a closed first position and in an open second position. In this arrangement FIG. 8 shows the seat element 7 in an open position. In this arrangement the seat element 7 is extended along the contour of the rear wall 11 so that an opening 8 allows access to the stowage space 3. In FIG. 9 the seat element 7 is in a closed first position so that the stowage space 3 or the opening 8 of the stowage space 3 is being closed. A passenger may now be seated on the shell structure or on the stowage space 3.

Figure 10:
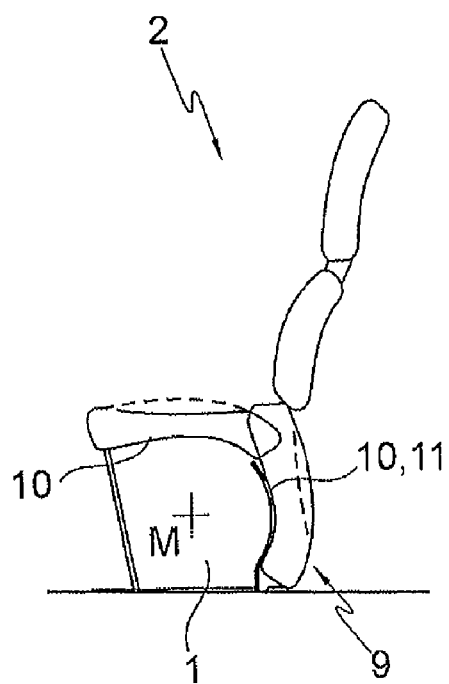
FIGS. 10, 11 a diagrammatic view of a seat device comprising a protective element in which the seat element is retractable, according to an embodiment.
Figure 11:
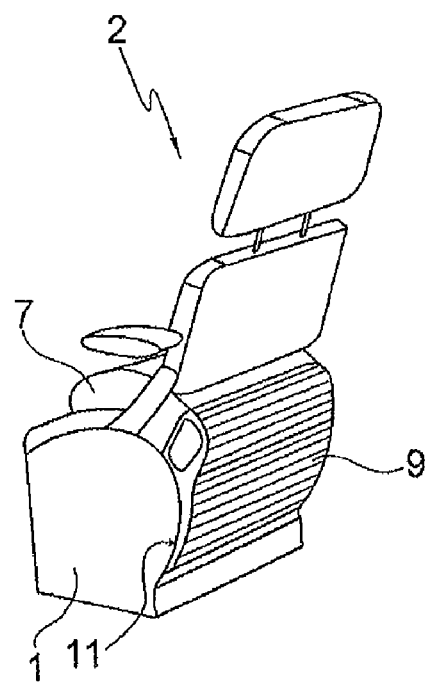

FIGS. 10 and 11 show a protective element 9 for protecting the seat element 7 in an open second position. As shown in FIG. 10 the protective element 9 is located on the rear wall 11 of the shell structure 1. In this arrangement the contour or shape of the protective element 9 may be identical to that of the seat element 7. When the seat element 7 is moved into the open position then the seat element 7 automatically, i.e. without the need for intervention by a passenger, moves into the protective device 9. In this way the seat element 7 remains hygienically clean and maynot be soiled, for example by the feet of a passenger seated behind. FIG. 11 shows, for example, a protective element 9 that may comprise a drawover film. When moving into an open position the seat element 7 moves into the protective film or into the protective element 9 and in this way remains protected.

Figure 12:
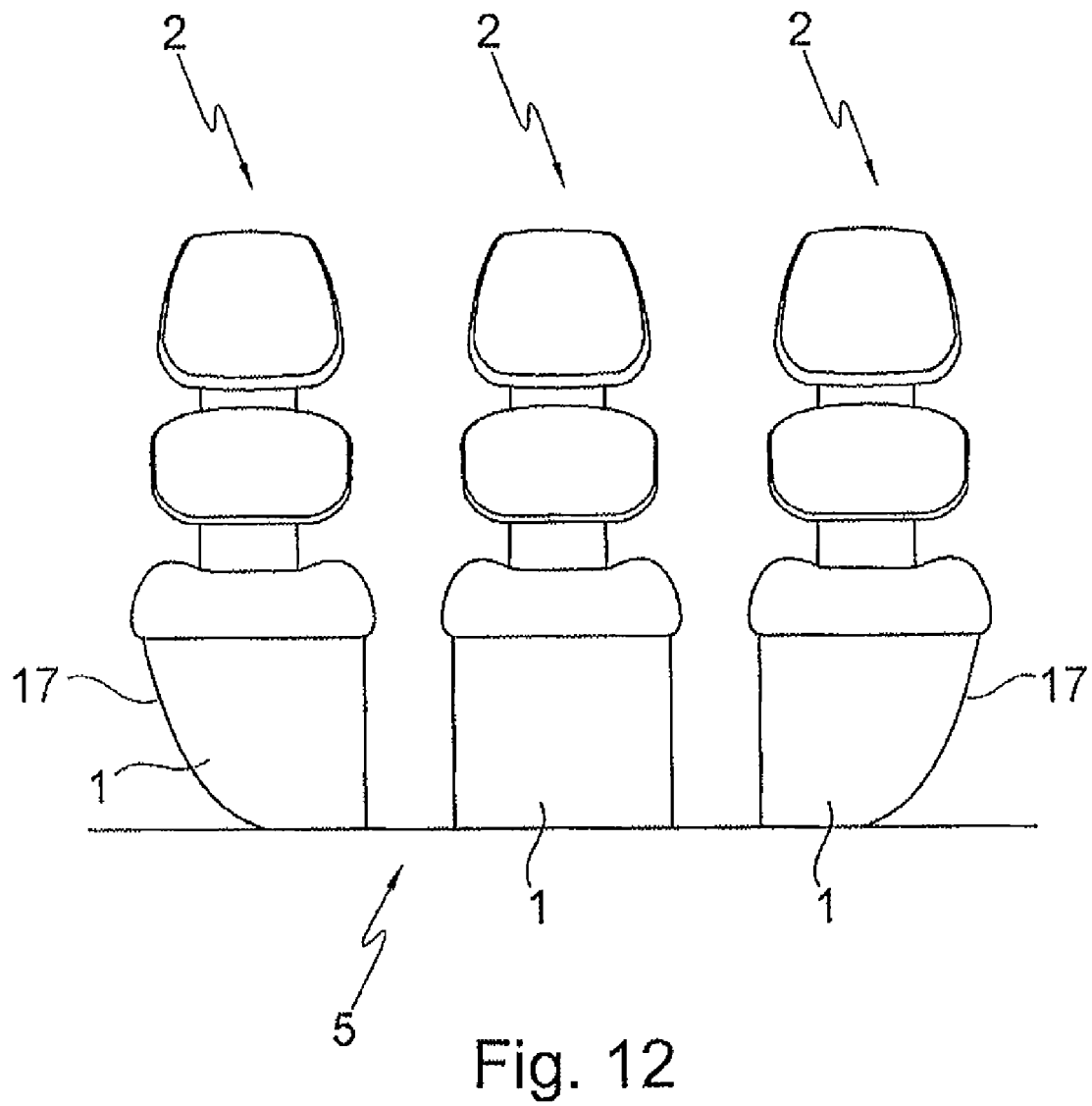
FIG. 12 a diagrammatic view of three seat devices comprising different side walls, according to an embodiment.

FIG. 12 shows three seat devices, each comprising a seat installation 2 and a shell structure 1. In this arrangement the right-hand and left-hand shell structures each comprise a side wall 17 which has a contour that is identical to that of the surface to which it is installed. In this arrangement the shape or contour of the side wall 17 may, for example, correspond to the shape of an aircraft fuselage or to the shape of the aircraft structure 18. In this arrangement the seat devices may be arranged on a base plate 5 so that a type of modular system may be created. In this arrangement the modular system comprises, for example, three different shell structures 1, namely a right-hand shell structure 1 and a left-hand shell structure 1, both comprising shaped side walls 17, and a third shell structure 1, which comprises straight side contours. In this way a base plate 5 may be equipped with standard components as required so that seat rows of different sizes may be provided in an aircraft.

Figure 13:
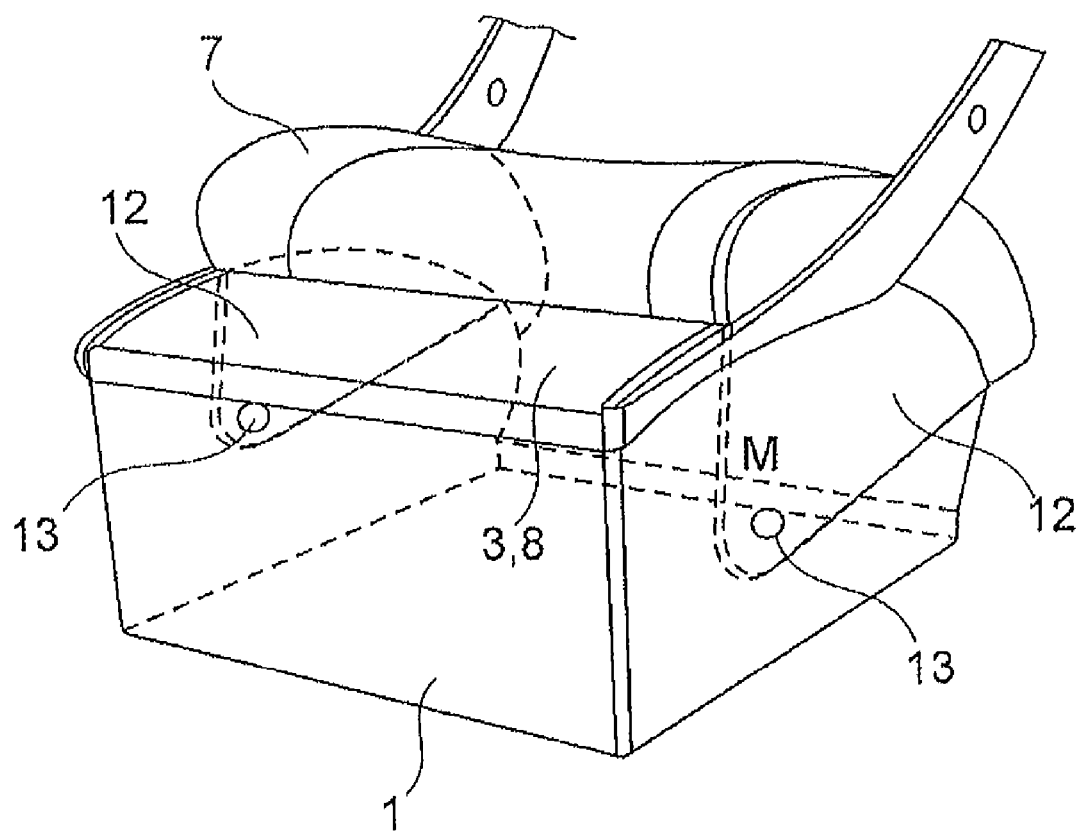
FIG. 13 a diagrammatic view of an opening mechanism of the seat element comprising a rotation cheek, according to an embodiment.

FIG. 13 shows a mechanism for displacing the seat element 7 along an arcuate path. In this arrangement the seat element 7 comprises a rotation cheek 12, which may be attached to the shell structure 1 on a rotation axis 13. In this arrangement the rotation axis 13 is attached in the center M of the arcuate path. The seat element 7 thus moves on the rotation axis 13 along a predetermined arcuate path. The lower seat area 10 of the seat element 7, and the rear wall 11 of the shell structure may both comprise the same contour as the arcuate path.

Figure 14:
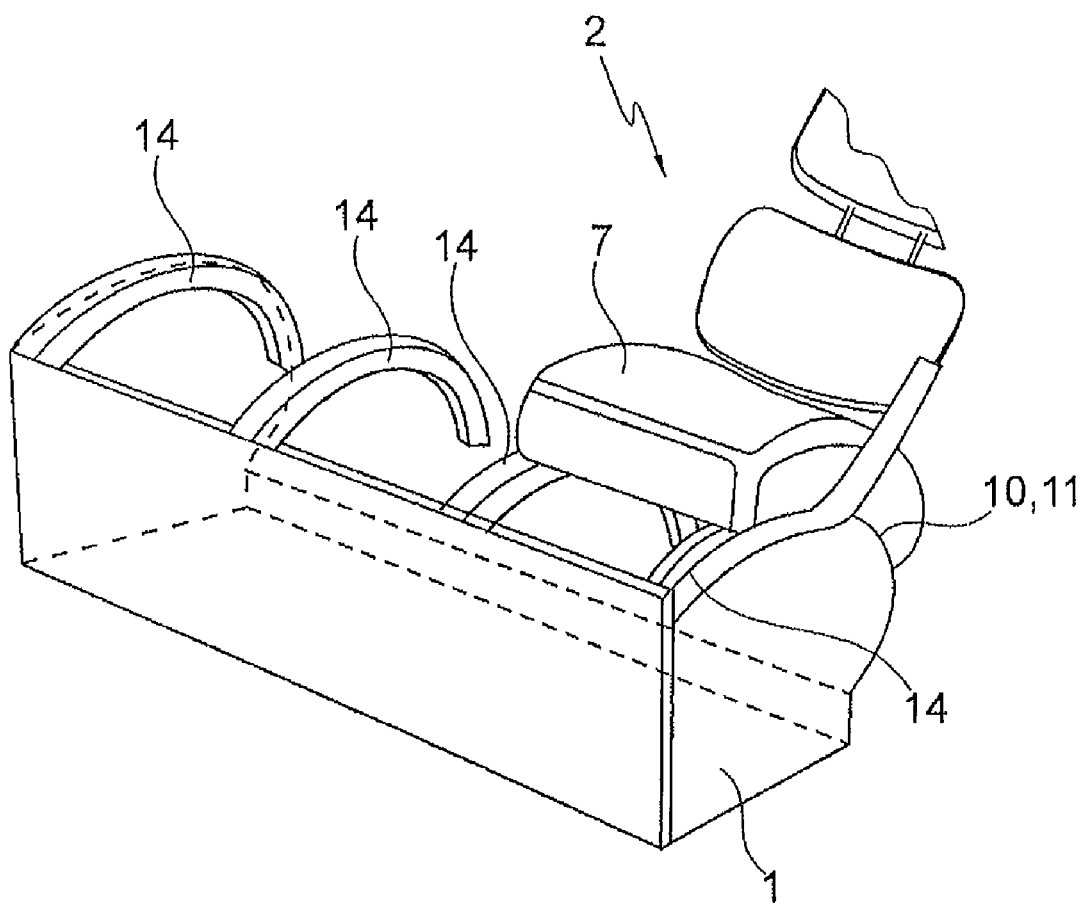
FIG. 14 a diagrammatic view of a seat device in which the seat element can be moved along a guide rail, according to an embodiment.

FIG. 14 shows a further opening mechanism of the shell structure 1, in which the guide rails 14 engage the seat element 7. In this arrangement the contours or the shapes of the guide rails 14 have the shape of the arcuate path. The seat element 7 may engage with its lower seat area 10 the guide rails 14, and the seat element 7 may be moved along the arcuate path so that the stowage space 3 of the shell structure 1 opens. In this arrangement the contour of the lower seat area 10 and of the rear wall 11 is again identical, for example in the shape of the arcuate path.

Figure 15:
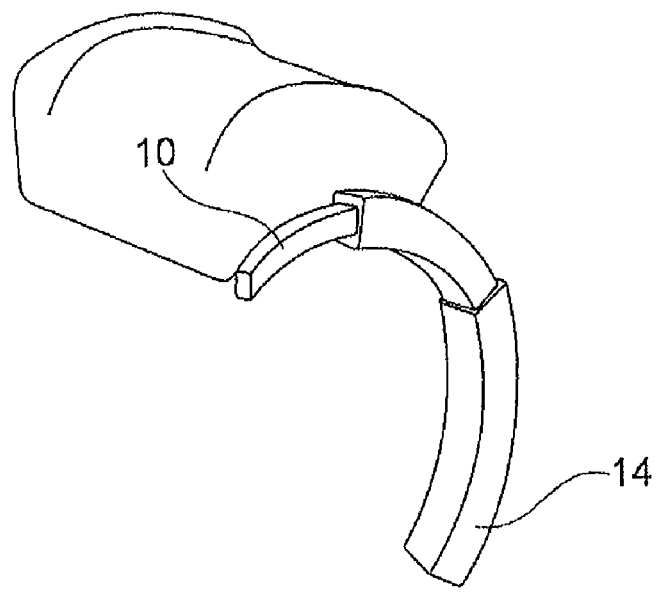
FIGS. 15, 16 diagrammatic views of a multipart guide rail according to an embodiment.

FIG. 15 shows a multipart guide rail 14 that engages the lower seat area 10. In this arrangement the diameters of the parts of the multipart guide rail 14 differ and may thus be telescopically slid into each other. In this way the seat element 7 may also be firmly connected to the guide rail 14 and by retracting the individual parts of the guide rail 14 telescopically into each other said seat element 7 may open the shell structure 1.

Figure 16:
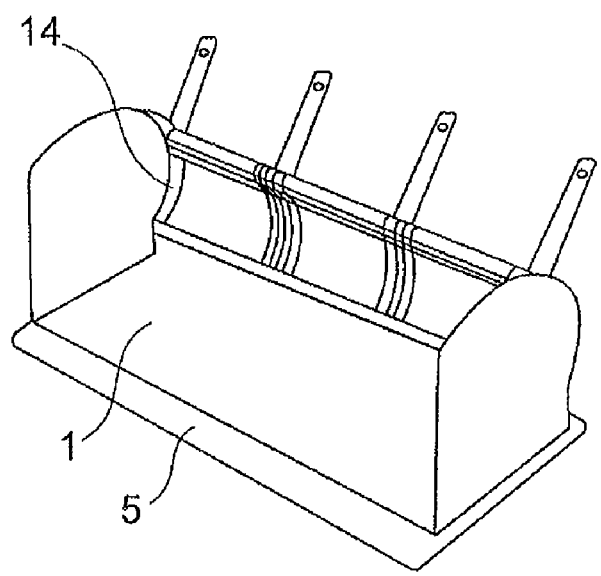

FIG. 16 shows a shell structure 1 in that the seat element 7 is in an open position. FIG. 16 shows three seat installations 2 in which the three seat elements are in an open position. Because of the multipart rail mechanism the stowage space 3 is not blocked by any elements of the opening mechanism so that the entire area of the stowage space may be utilised.

Figure 17:
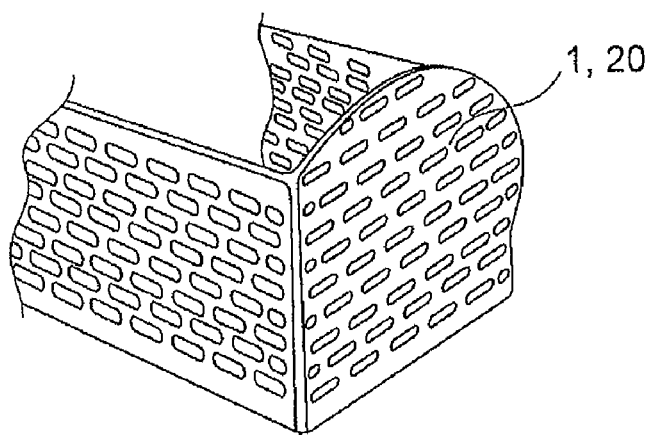
FIGS. 17-19 diagrammatic views of perforated shell structures according to embodiments.
Figure 18:
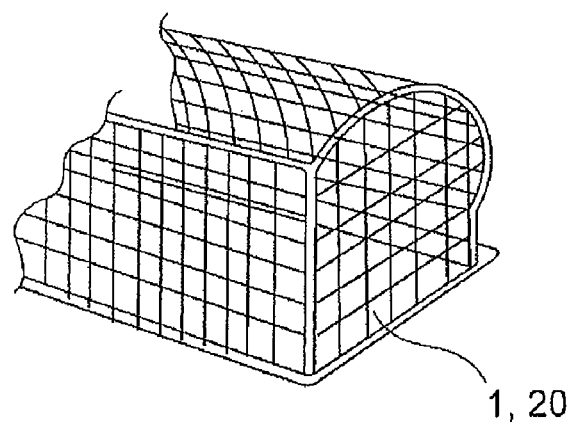
Figure 19:
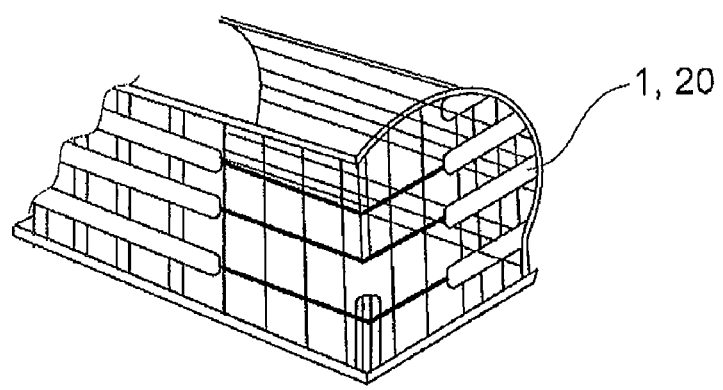

FIGS. 17-19 show perforated shell structures 20. FIG. 17 shows a shell structure 1, 20 that is designed as a stamped perforated metal sheet, FIG. 18 shows a framework structure, while FIG. 19 shows an open-worked composite material shell structure having open-worked fields, lightweight construction may therefore be implemented, and in addition the item of baggage contained in the shell structure may be made visible. Dangerous items of baggage may therefore be detected more easily, and on-board safety may be improved. Furthermore, the perforated shell structures 20 may serve as cushioning elements or deformation elements in order to cushion forces exerted on a seat installation.

FIGS. 20-23 show embodiments of shell structures 1 comprising a deformation area or a deformation region 15. In this arrangement the deformation region 15 is designed in a concertina-like manner or in the shape of a bellows.

Figure 20:
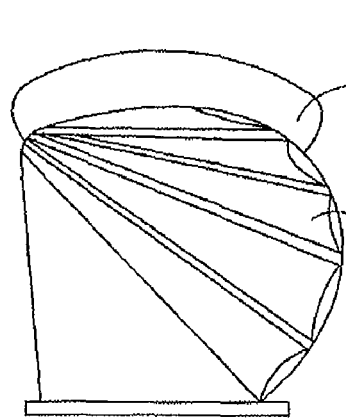
FIGS. 20-23 diagrammatic views of a deformation area of a shell structure with concertina-type contours, according to an embodiment.
Figure 21:
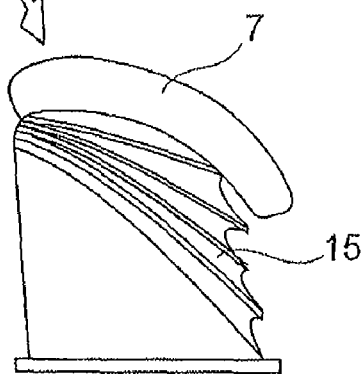
Figure 22:
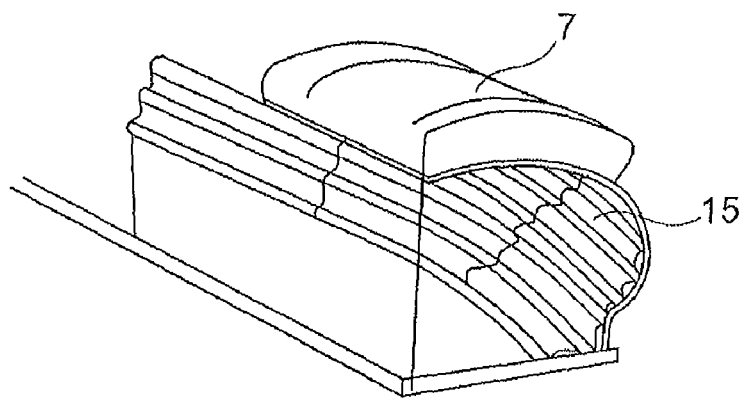
Figure 23:
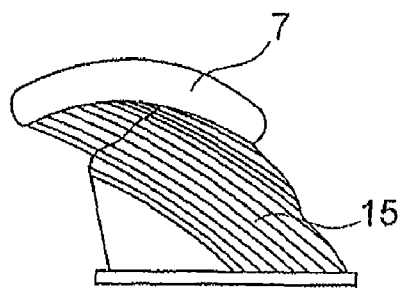

FIGS. 20 and 21 show a deformation region 15 in which the seat element 7 may be moved on a rotation axis. FIG. 20 shows a undeformed deformation region 15 of the shell structure 1 coupled to a seat element 7 of a seat installation 2. FIG. 21 shows a deformation region 15 of the shell structure 1, which deformation region 15 has been deformed as a result of the action of a force being exerted on the seat element 7 or the shell structure 1 or both. FIGS. 22 and 23 show a deformation structure or a deformation region 15 having a concertina-like structure, such as individual lamellae arranged in a parallel relation to each other. Bu arranging the orientation of the individual lamellae one to the other, in this way, a direction of deformation may be oriented by design to be a linear, rotational or combination of linear and rotational motion. In the case of the lamella arrangement of FIG. 20, as a result of the action of a force, the seat element 7 moves on a rotation axis, while in the lamella arrangement of FIG. 22 the seat element moves, for example, in a linear manner. Linear deformation becomes evident in a comparison of FIG. 22 with FIG. 23, for example.

Figure 24:
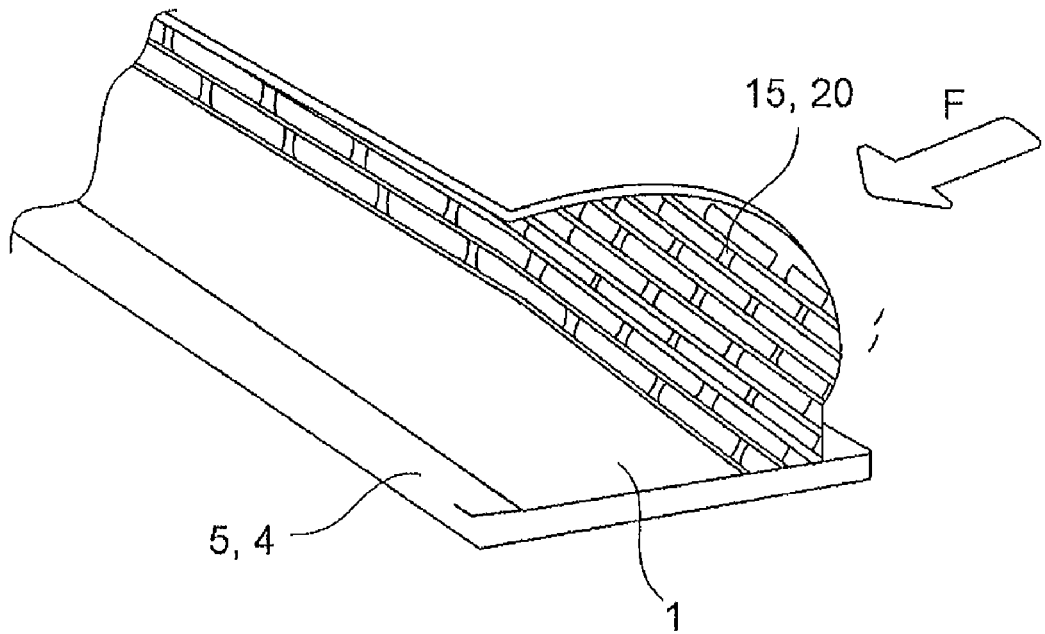
FIGS. 24, 25 diagrammatic views of a perforated shell structure comprising a deformation area, according to an embodiment.
Figure 25:
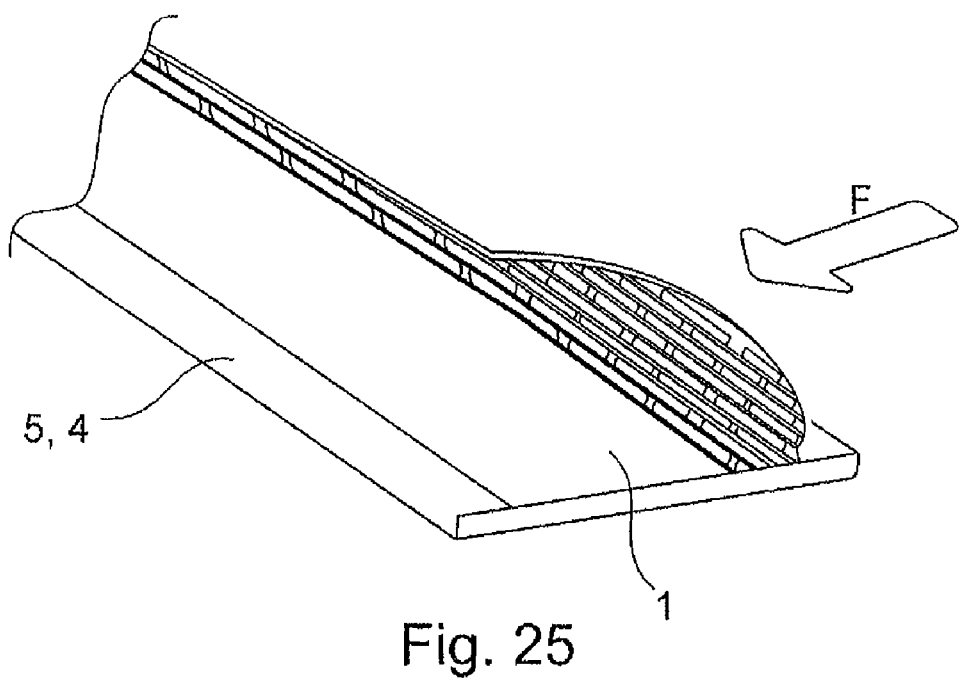

FIGS. 24 and 25 show a deformation region 15 that may be implemented with a perforated structure 1. FIG. 24 shows the deformation area 20 before the action of force, while FIG. 25 shows the deformation region 15 after the action of force.

By means of the concertina-like deformation regions 15 or the perforated shell structures 20, the action of force may be cushioned so that not only is there an improvement in the seating comfort for passengers, but also cushioning of any severe impact due to an accident. It is thus possible to reliably construct a passenger seat which, for example, has to withstand deceleration forces of up to 16 g in the direction of flight, or 9 g vertically downwards.

Figure 26:
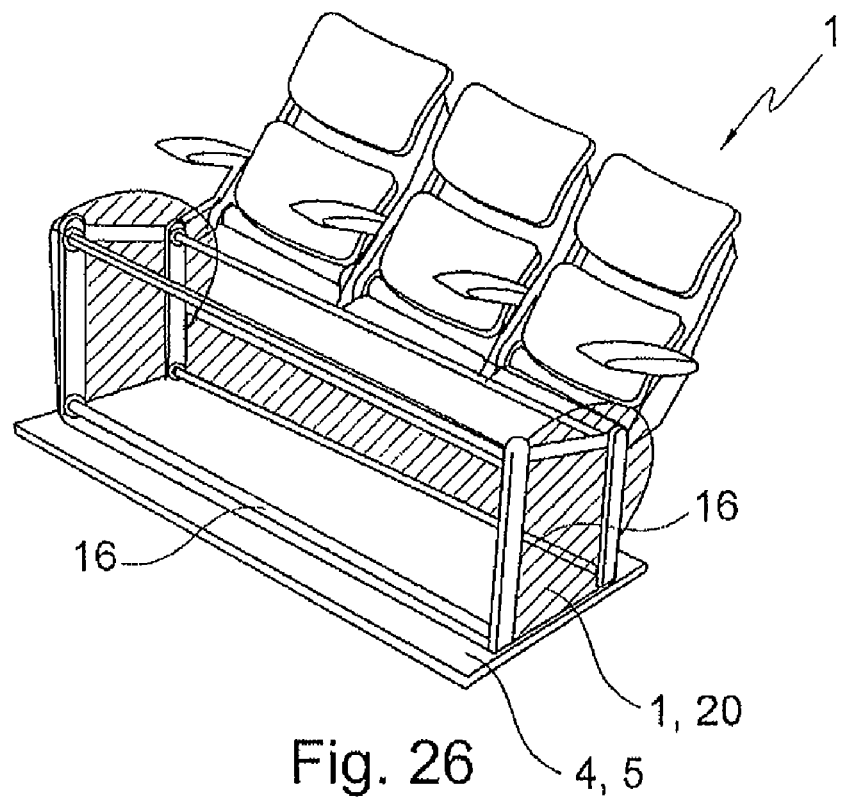
FIGS. 26, 27 diagrammatic views of a seat device comprising torsion bars and concertina-type deformation areas, according to an embodiment.
Figure 27:
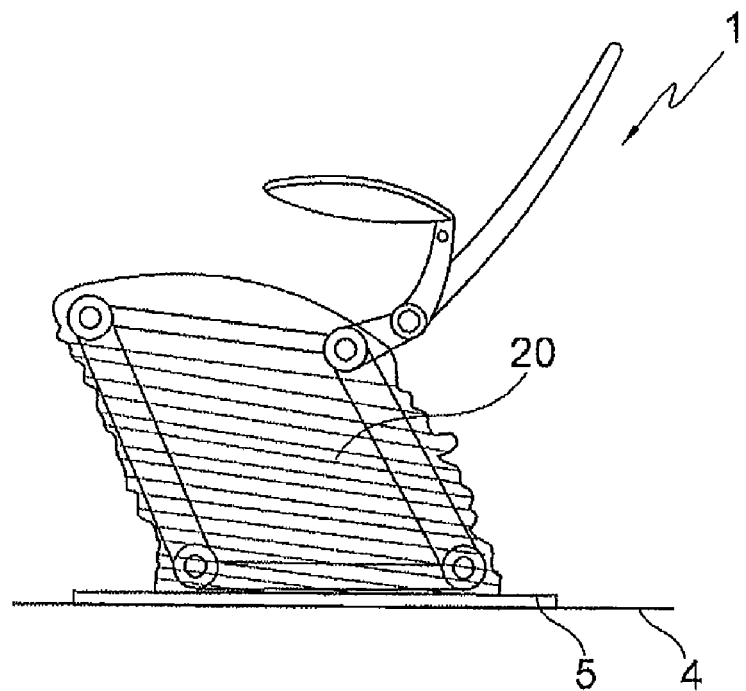

FIGS. 26 and 27 show a seat device in which three seat installations 2 are arranged on a shell structure 1. If a load acts on the end seat installation 2, torsion bars 16 prevent one-sided dropping of the shell structures and thus of the seat installations 2 from occurring. For this purpose a torsion bar 16 extends along the entire length of the shell structure 1 in order to prevent twisting and in order to reinforce the shell structure 1. Furthermore, FIG. 27 also shows a perforated structure of the shell structure 1.

Figure 28:
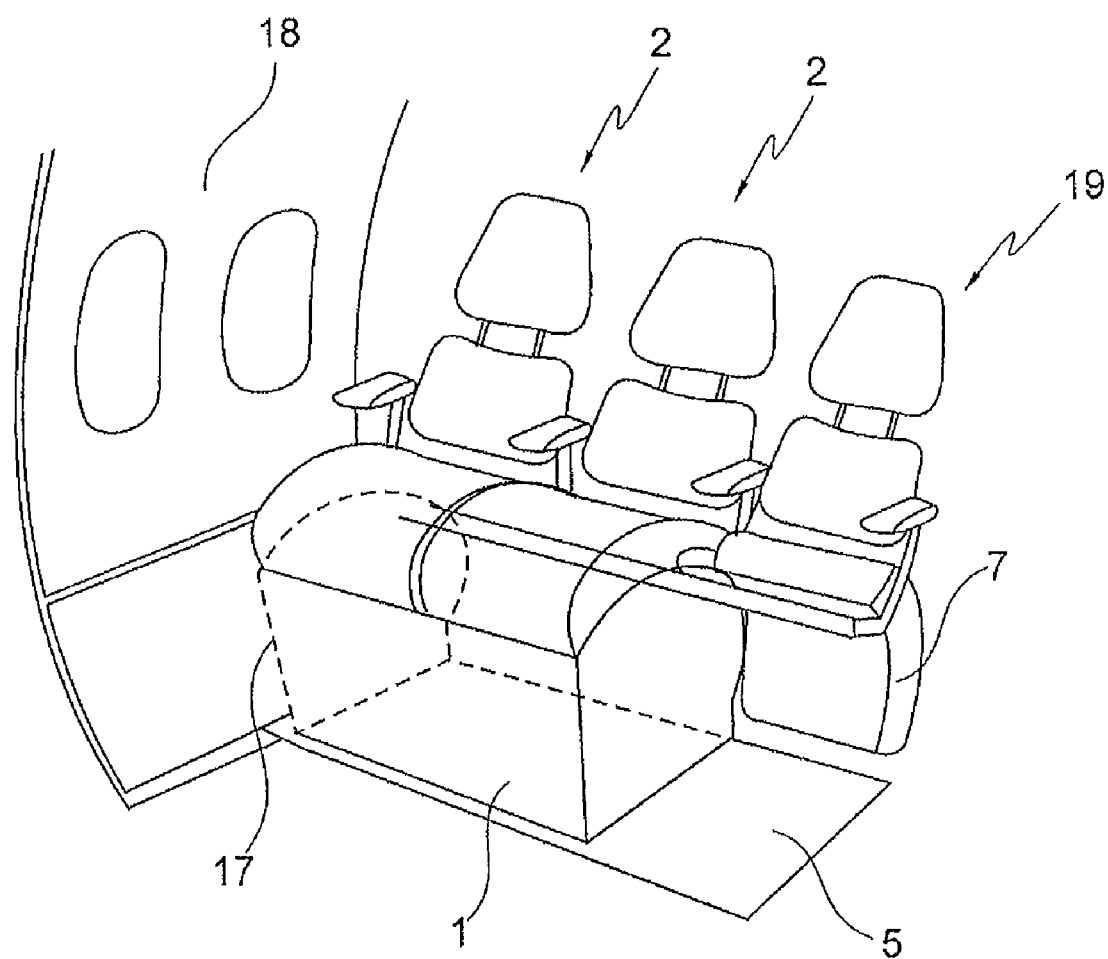
FIG. 28 a diagrammatic view of a seat device comprising a further seat installation, according to an embodiment.

FIG. 28 shows a shell structure 1 comprising two seat installations 2 and a further seat installation 19. The two seat installations 2 and the further seat installation 19 are connected to the shell structure 1, and may share a stowage space 3. Between the further seat installation 19 and the base plate 5 there is no shell structure 1 but instead a free space. If required, the seat element 7 of the further seat installation 19 may be moved towards the rear, along an arcuate path, so that a clearance space or an open region is formed. This open region may, for example, be used by a passenger to stand clear of the aisle so that obstruction is minimised. Consequently, boarding of the aircraft and deplaning may take place more quickly.

In addition, it should be pointed out that "comprising" does not exclude other elements or steps, and "a" or "one" does not exclude a plural number. Furthermore, it should be pointed out that characteristics or steps which have been described with reference to one of the above embodiments may also be used in combination with other characteristics or steps of other embodiments described above. Reference characters in the claims are not to be interpreted as limitations.

Alternative combinations and variation of the examples provided will become apparent based on this disclosure. It is not possible to provide specific examples for all of the many possible combinations and variations of the embodiments described, but such combinations and variations may be claims that eventually issue.

LIST OF REFERENCE CHARACTERS

1 Shell structure
2 Seat installation
3 Stowage space
4 Floor structure
5 Base plate
6 Attachment surface
7 Seat element
8 Opening
9 Protective element
10 Lower seat area
11 Rear wall
12 Rotation cheek
13 Rotation axis
14 Guide rail
15 Deformation region
16 Torsion bar
17 Side wall
18 Aircraft structure
19 Further seat installation
20 Perforated structure
F Force
M Center of the circle

What is claimed is:

1. A seat device for an aircraft having a floor structure, the seat device comprising:
   a seat installation; and
   a shell structure attachable to the floor of the aircraft, wherein the shell structure comprises a deformation region and an enclosed stowage space for accommodating an item of baggage wherein the deformation region comprises a deformable structure capable of cushioning force acting on the shell structure by deforming such that the seat device is capable of withstanding deceleration forces up to 16 times the force of gravity.

2. The seat device of claim 1 further comprising:
   a base plate, wherein the shell structure is attached to the base plate, and the base plate is attachable to the floor structure.

3. The seat device of claim 2, wherein the shell structure is slidably attached to the base plate.

4. The seat device of claim 2, wherein the shell structure forms an attachment surface with the base plate, and the base plate has an area larger than an area of the attachment surface.

5. The seat device of claim 1, wherein:
   the seat installation comprises a seat element; and
   the shell structure comprises an opening to the enclosed stowage space, and the seat element is movably coupled to the shell structure, such that the seat element closes the opening of the shell structure in a first position and opens the opening of the shell structure in a second position, and the enclosed stowage space is accessible, when the seat element is in the second position.

6. The seat device of claim 5, wherein the shell structure comprises a protective element, and the protective element accommodates the seat element, when the seat element is in the second position.

7. The seat device of claim 5, wherein the seat element is movably coupled to the shell structure such that, when the seat element is moved from the first position to the second position, the seat element moves tangentially in relation to an arcuate path.

8. The seat device of claim 7, wherein the seat element comprises a lower seat area, and the lower seat area has a contour in the shape of the arcuate path.

9. The seat device of claim 7, wherein the shell structure comprises a rear wall, and the rear wall has a wall contour portion in the shape of the arcuate path.

10. The seat device of claim 7, wherein the seat element comprises a rotation cheek, and the rotation cheek is coupled at a rotation axis to the shell structure such that the rotation cheek rotates, and the rotation cheek is coupled to the seat element such that the seat element is movable on the rotation axis tangentially in relation to the arcuate path.

11. The seat device of claim 7, wherein the shell structure comprises a guide rail having a contour, such that the contour of the guide rail corresponds to the shape of the arcuate path, and the seat element engages the guide rail such that the seat element is tangentially movable in relation to the arcuate path.

12. The seat device of claim 11 wherein the guide rail comprises a plurality of parts, such that the plurality of parts are telescopically retractable.

13. The seat device of claim 1, wherein the shell structure comprises a perforated structure, and the perforated structure is selected from the group of perforated structures consisting of stamped perforated metal sheets, framework structures, a mesh, and open-worked composite material shells.

14. The seat device of claim 1, wherein the shell structure comprises at least one torsion bar mounted to the shell structure such that twisting of the shell structure is reduced.

15. The seat device of claim 14 wherein the shell structure comprises a framework structure with a plurality of levers, and the plurality of levers form a parallelogram or a trapezoidal shape, and the at least one torsion bar is coupled with at least one of the plurality of levers.

16. The seat device of claim 1, wherein the seat installation includes a plurality of seat installations, and the plurality of seat installations are mounted on the shell structure, such that the plurality of seat installations are attachable to the floor structure by attaching the shell structure to the floor structure.

17. The seat device of claim 1, for an aircraft having a curvature of the aircraft structure, wherein the shell structure comprises a side wall, and the side wall has a curvature that corresponds to the curvature of the aircraft structure.

18. The seat device of claim 1, further comprising:
   a further seat installation, wherein the shell structure is designed to attach the further seat installation to a floor structure, and the further seat installation extends outwardly from the shell structure defining a clearance space between the floor structure and the further seat installation.

19. The seat device of claim 2 further comprising:
   a plurality of shell structures, wherein the plurality of shell structures are attachable to the base plate.

20. A method comprising:
   attaching the seat device of claim 1 to a floor structure of an aircraft; and
   using the seat device for stowing of baggage below the seat structure in the enclosed stowage space.

21. An aircraft comprising a seat device of claim 1 attached to a floor structure of the aircraft.

22. The seat device of claim 13, wherein the perforated structure consists of open-worked composite material shells.

* * * * *